Patented Aug. 10, 1943

2,326,287

UNITED STATES PATENT OFFICE 2,326,287

COPOLYMER OF UNSATURATED ISOCYANATES

Donald Drake Coffman, Wilmington, Del., assignor to E. I. du Pont de Nemours & Company, Wilmington, Del., a corporation of Delaware No Drawing. Application September 4, 1940, Serial No. 355,412

14 Claims. (Cl. 260—84)

This invention relates to new polymeric materials and more particularly to copolymers of 1-alkenyl isocyanates with vinyl and vinylidene compounds.

This invention has as an object the preparation of new copolymers. A further object is the preparation of coating compositions, molding compositions and the like. Other objects will appear hereinafter.

These objects are accomplished by the following invention wherein a 1-alkenyl isocyanate, i. e., an isocyanate in which the isocyanate group is attached to a carbon atom which is joined to a second carbon atom by an ethylenic bond is polymerized with a different polymerizable organic compound of the class consisting of polymerizable vinyl and vinylidene compounds.

Copolymers of 1-alkenyl isocyanates with vinyl and vinylidene compounds are in general made by mixing in the desired proportions and under anhydrous conditions the particular monomeric 1-alkenyl isocyanate with the appropriate monomeric vinyl or vinylidene compound, and exposing the mixture to the influence of ultraviolet light and/or heat, in the presence or absence of a peroxide catalyst such as benzoyl peroxide. The copolymerization may be carried out in the absence of a solvent for the mixture or in an inert medium such as dioxane. Ultraviolet light and peroxide catalysts exert an accelerating influence upon these polymerizations, and for this reason their use is preferred. The exclusion of traces of all substances containing a reactive hydrogen atom, such as water, acids, alcohols, and primary or secondary amines, from the reaction system is necessary, since such substances react readily with and destroy 1-alkenyl isocyanates. The copolymers, as formed by bulk or solution polymerization, may be used as such or subjected to purification treatment; i. e., removal of excess monomer by solution of the copolymer in an appropriate solvent followed by precipitation of the polymer.

The reaction vessel used is one that allows the transmission of light to its interior, provided photocatalysis is employed, and while not necessarily sealed to the air, is so constructed as to prevent escape of the more volatile monomeric ingredients and access of moisture.

The 1-alkenyl isocyanates may be prepared by pyrolyzing, at elevated temperatures in the neighborhood of 400° C., the N-carbethoxyketimines and aldimines obtained by reacting the corresponding ketal or acetal with ethyl urethane, or by the decomposition of the corresponding 1-alkenyl formyl azide prepared from a metallic azide such as sodium azide and the appropriate 1-alkenyl formyl chloride.

The more detailed practice of the invention is illustrated by the following examples, wherein parts given are by weight. There are of course many forms of the invention other than these specific embodiments.

EXAMPLE I

*Copolymerization of isopropenyl isocyanate with methyl methacrylate*

Into each of three "Pyrex" reaction vessels, previously carefully cleaned and filled with dry nitrogen, one of which contains 1% (by weight of monomer mixture) of benzoyl peroxide, are put 1 part by volume of isopropenyl isocyanate and 2 parts by volume of methyl methacrylate. The reactors are closed immediately after charging. Two reactors, one with and one without peroxide catalyst, are heated at 70° C. The remaining reactor is placed at ordinary temperature and without special heating at a distance of 15 inches from the arc of a Cooper-Hewitt mercury lamp. Within a period of two weeks the samples polymerize to such an extent that only small amounts of monomer can be recovered from the polymer mixture. The polymer formed under ultraviolet light is slightly harder (on the Moh scale) and higher softening than the polymer formed at 70° C. in the presence of peroxide. Both polymers are clear, slightly yellow, tough, and soluble in chloroform and dioxane. The polymer obtained with the aid of ultraviolet light has a Moh hardness of 2.5 and a softening point of 87° C. The polymer obtained at 70° C. with peroxide has a Moh hardness of 1.8 and a softening point of 76° C. After four weeks the polymer obtained by heating the mixture of monomer at 70° C. without benzoyl peroxide is a translucent yellow solid. When the methyl methacrylate of this example is replaced by an equal volume of styrene all the mixtures polymerize in two weeks to clear, yellow, soft, and rubbery polymers.

EXAMPLE II

*Copolymerization of vinyl isocyanate with methyl methacrylate*

A solution of 1 part of vinyl isocyanate in 2 parts of methyl methacrylate, contained in a glass reactor, and exposed to ultraviolet light for two weeks, polymerizes to a translucent, thermoplastic resin of Moh hardness 2.0 and softening point 100° C. This polymer is soluble in chloroform and dioxane.

EXAMPLE III

*Copolymerization of propenyl isocyanate with methyl methacrylate*

Copolymers containing 2 to 10 volume per cent propenyl isocyanate in methyl methacrylate are made by charging dry, clean, nitrogen-filled reactors with approprate amounts of the compounds, as indicated in the following table, along with 1% (by weight of the monomer mixture) of benzoyl peroxide and either heating to 70° C. or exposing, at ordinary temperature, to the light of a Cooper-Hewitt mercury lamp. As the concentration of propenyl isocyanate in methyl methacrylate increases, there is a lowering of the softening point and decrease in hardness of the interpolymer as measured on the Pfund hardness tester which instrument measures the weight required to force a quartz ball of ¼ inch diameter to a given depth in the surface of the polymer. Copolymers containing small amounts of propenyl isocyanate are harder than the methyl methacrylate control.

| | | | |
|---|---|---|---|
| Propenyl isocyanate parts by volume__ | 0.2 | 0.5 | 1.0 |
| Methyl methacrylate_____do____ | 9.8 | 9.5 | 9.0 |
| Volume per cent propenyl isocyanate _____per cent__ | 2 | 5 | 10 |
| Ultraviolet light copolymer: | | | |
| Softening point_____° C__ | 117 | 115 | 113 |
| Hardness_____ | 480 | 425 | 380 |
| 70° C. polymer: Softening point ° C__ | 139 | 139 | |

The methyl methacrylate control, polymerized at ordinary temperature in ultraviolet light in the presence of benzoyl peroxide, has a hardness on the Pfund scale of 430.

EXAMPLE IV

*Copolymerization of propenyl isocyanate with styrene*

Copolymers containing 2 to 10 volume per cent propenyl isocyanate in styrene are made by mixing the monomers in the manner outlined in Example III and exposing the mixtures containing benzoyl peroxide to ultraviolet light for two weeks at ordinary temperatures.

| | | | |
|---|---|---|---|
| Volume per cent propenyl isocyanate _____per cent__ | 2 | 5 | 10 |
| Ultraviolet light copolymer: | | | |
| Softening point_____° C__ | 91 | 83 | 72 |
| Hardness_____ | 370 | 365 | 300 |

The styrene control, polymerized in the same manner, has a hardness as measured on the Pfund instrument of 300. As the concentration of isocyanate in the copolymer increases, there is a lowering of the softening point and a decrease in the hardness. Copolymers containing small amounts, i. e., up to 10%, of propenyl isocyanate are harder than the styrene control.

EXAMPLE V

*Copolymerization of propenyl isocyanate with vinyl acetate*

A solution of 0.5 part propenyl isocyanate in 9.5 parts of vinyl acetate, containing 0.1 part of benzoyl peroxide, polymerizes within one week under ultraviolet light to a clear hard thermoplastic resin softening at 48° C.

In the process of the present invention there may be employed any organic isocyanate having an ethylenic double bond between the carbon attached to the —NCO group and a second carbon. Any remaining valences of the two ethylenically bonded carbons are satisfied by hydrogen or monovalent organic radicals which may be saturated or unsaturated, acyclic, aromatic, alicyclic or heterocyclic, and which are free of groups reactive with the isocyanate. The process of the invention is thus applicable, though not limited, to isopropenyl, 1-butenyl, 2-butenyl, 1-phenylvinyl, styryl, 1-p-chlorophenylvinyl, propenyl, 1-methylpropenyl, 2-naphthylvinyl, 1-ethoxyvinyl, 1-phenoxyvinyl, 1-octodecylvinyl, 1-cyclohexylvinyl, 2-cyclohexylvinyl and 2-furylvinyl isocyanates.

A preferred class of the alkenyl isocyanates is that having at least one hydrogen on the carbon ethylenically double bonded to the carbon attached to the isocyanate group. These preferred isocyanates are represented by the formula $$R(H)C=C(R')NCO$$

in which R and R' may be hydrogen atoms or monovalent organic radicals as hereinbefore defined. These isocyanates are preferred because they copolymerize with greater ease with other vinyl or vinylidene compounds. Another preferred subclass is that wherein the radical attached to the isocyanate group is completely hydrocarbon and at least one hydrogen is on the carbon ethylenically bonded to the carbon bearing the isocyanate group. The organic isocyanates of this invention copolymerize with polymerizable vinyl and vinylidene compounds. These contain a methylene group attached by an ethylenic bond to a carbon atom itself attached to at least one negative group.

Representative vinyl and vinylidene compounds are vinyl chloride, vinyl bromide, methyl acrylate, methyl methacrylate, chloroprene, butadiene, methyl alpha-chloroacrylate, vinyl acetate, styrene, unsymmetrical dichloroethylene, etc.

The invention is not limited with respect to the particular combination of components making up the copolymers of this invention or their relative proportions. In general, there is advantage from both the cost and utility standpoint in keeping the percentage of the 1-alkenyl isocyanate in the polymer under 30%; but this percentage may be increased if a copolymer of certain physical and chemical properties is desired.

The invention is not restricted to any particular method of polymerizing the isocyanates of this invention and the vinyl and vinylidene derivatives. The copolymerizations can be effected in bulk at any temperature below decomposition temperature, in the presence of light or using any relatively stable organic peroxide as catalyst, in open or closed containers, providing that the open containers do not permit loss of the more volatile vinyl compounds or the access of moisture, and at subatmospheric, atmospheric, or superatmospheric pressures. The polymerization can also be carried out in solution or in dispersion in any inert solvent, i. e., dioxane, dibutyl ether, xylene, benzene, etc.

The copolymers of this invention differ from the homopolymers and also from one another in physical properties such as hardness and softening temperature, and also possess the unique advantage of having reactive isocyanate groups. Thus, a copolymer such as that of 30% isopropenyl isocyanate with methyl methacrylate when applied from organic solvent solution to a fabric imparts a definite and durable water repellency which is not destroyed by laundering. The water-repellent finish thus obtained is about 80% as effective as that obtained with a 2.5% aqueous solution of stearamidomethylpyridinium chloride. The incorporation of the highly reactive isocyanate group in vinyl-type polymers permits their further modification through interreaction with compounds, monomeric, or polymeric, containing one or more reactive hydrogen atoms such as cellulosic materials, alkyd resins, monoamines, diamines, polyamines, mono- and polycarboxylic acids, polyhydric compounds, alcohols, thiols, polythiols, aminoalcohols, amino acids, hydroxy acids, etc.

The above description and examples are intended to be illustrative only. Any modification of or variation therefrom which conforms to the spirit of the invention is intended to be included within the scope of the claims.

What is claimed is:

1. A copolymer, with a member of the class consisting of polymerizable vinyl and vinylidene compounds, of an organic isocyanate having the —NCO group attached to a carbon in turn attached to a second carbon by means of an aliphatic ethylenic double bond, the remaining valences of said carbons not satisfied by hydrogen being satisfied by monovalent organic radicals free from groups reactive with the isocyanate group.

2. A copolymer according to claim 1, wherein the organic isocyanate has at least one hydrogen on the carbon atom ethylenically bonded to the carbon attached to the isocyanate group.

3. A copolymer according to claim 1, wherein the organic isocyanate contains, other than the isocyanate group, only carbon and hydrogen and has at least one hydrogen on the carbon atom ethylenically bonded to the carbon atom attached to the isocyanate group.

4. A copolymer according to claim 1, wherein the organic isocyanate contains, other than the isocyanate group, only carbon and hydrogen, contains but one unsaturated linkage, and has at least one hydrogen on the carbon atom ethylenically bonded to the carbon atom attached to the isocyanate group.

5. A copolymer according to claim 1, containing not more than 30% of the isocyanate by weight in the copolymer.

6. A copolymer, with a polymerizable compound of the class consisting of vinyl and vinylidene compounds, of a completely aliphatic isocyanate, wherein the isocyanate group is attached to a monovalent aliphatic hydrocarbon radical through a carbon itself linked by an ethylenic double bond to a methylene ($CH_2$) group, said copolymer containing up to 30% of the organic isocyanate.

7. A copolymer of a 1-alkenyl isocyanate with a member of the class consisting of polymerizable vinyl and vinylidene compounds.

8. A copolymer of isopropenyl isocyanate with a member of the class consisting of polymerizable vinyl and vinylidene compounds.

9. A copolymer of vinyl isocyanate with a member of the class consisting of polymerizable vinyl and vinylidene compounds.

10. A copolymer of propenyl isocyanate with a member of the class consisting of polymerizable vinyl and vinylidene compounds.

11. A copolymer of isopropenyl isocyanate with methyl methacrylate.

12. A copolymer of vinyl isocyanate with methyl methacrylate.

13. A copolymer of propenyl isocyanate with styrene.

14. A copolymer of propenyl isocyanate with 90 to 98%, by volume of the copolymer, of styrene.

DONALD DRAKE COFFMAN.